(12) United States Patent
Klausler et al.

(10) Patent No.: US 9,450,775 B1
(45) Date of Patent: Sep. 20, 2016

(54) SYSTEM AND METHOD FOR BOUNCING TRAFFIC IN DEADLOCK SAFE MANNER

(75) Inventors: Peter Michael Klausler, Middleton, WI (US); Philip Michael Wells, Madison, WI (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 13/552,914

(22) Filed: Jul. 19, 2012

(51) Int. Cl.
  *H04L 12/28* (2006.01)
  *H04L 12/26* (2006.01)

(52) U.S. Cl.
  CPC .................................. *H04L 12/26* (2013.01)

(58) Field of Classification Search
  USPC ........................................................ 370/221
  See application file for complete search history.

(56) References Cited

U.S. PATENT DOCUMENTS

| | | | |
|---|---|---|---|
| 6,785,280 B1* | 8/2004 | Tovander .................... | 370/395.1 |
| 7,345,991 B1* | 3/2008 | Shabtay .............. | H04L 12/2863 370/221 |
| 7,719,959 B2* | 5/2010 | Shah ...................... | H04L 12/185 370/219 |
| 7,894,374 B2* | 2/2011 | Enomoto et al. ............. | 370/256 |
| 7,899,062 B2* | 3/2011 | Liu et al. ................... | 370/395.5 |
| 8,200,871 B2* | 6/2012 | Rangan et al. ................. | 710/74 |
| 8,547,828 B2* | 10/2013 | Joshi et al. .................... | 370/217 |
| 2006/0159009 A1* | 7/2006 | Kim et al. .................... | 370/216 |
| 2007/0165515 A1* | 7/2007 | Vasseur ......................... | 370/216 |
| 2008/0259913 A1* | 10/2008 | Shah ..................... | H04L 12/185 370/386 |
| 2009/0180481 A1* | 7/2009 | Sierecki .................... | 370/395.52 |
| 2010/0177631 A1* | 7/2010 | Chen et al. .................... | 370/221 |
| 2010/0315943 A1* | 12/2010 | Chao et al. ................... | 370/221 |
| 2011/0211445 A1* | 9/2011 | Chen ............................. | 370/221 |
| 2011/0242968 A1* | 10/2011 | Cirkovic et al. .............. | 370/221 |
| 2013/0235716 A1* | 9/2013 | Vasseur ................... | H04L 12/66 370/221 |
| 2013/0301403 A1* | 11/2013 | Esale ...................... | H04L 45/16 370/221 |

OTHER PUBLICATIONS

Ville Rantala, Teijo Lehtonen, and Juha Plosila, "Network on Chip Routing Algorithms", TUCS Technical Report, No. 779, Aug. 2006, 38 pages.
Naresh Kumar, Renu Vig and Deepak Bagai, Up-Down Routing Based Deadlock Free Dynamic Reconfiguration in High Speed Local Area Networks, Global Journal of Computer Science and Technology, vol. 11, Issue 7 Version 1.0, May 2011, 11 pages.
Lalit Kishore Arora, and Rajkumar, Optimizing Up/Down Routing by Minimal Paths, International Journal of Computer Applications, vol. 5, No. 1, Aug. 2010, 4 pages.
Loren Schwiebert and D.N. Jayasimha, Optimal Fully Adaptive Minimal Wormhole Routing for Meshes, downloaded Apr. 26, 2012, 27 pages.

* cited by examiner

*Primary Examiner* — Ian N Moore
*Assistant Examiner* — Lakeram Jangbahadur
(74) *Attorney, Agent, or Firm* — McDermott Will & Emery

(57) ABSTRACT

A network may be configured to route traffic in such a way as to avoid packet loss in an event of link failure. The network may include a plurality of inner switches and a plurality of outer switches coupled to the plurality of inner switches. Each inner switch may be configured to receive traffic, determine whether a link to a next hop for the traffic is down, and forward the traffic to another outer switch if the link to the next hop is down. Each outer switch may be configured to bounce traffic received from the first inner switch to a second inner switch if the traffic is received as a result of determining that the link from the inner switch to the next hop is down. The second inner switch may then deliver the traffic, or further bounce the traffic off another outer switch.

7 Claims, 5 Drawing Sheets

SYSTEM AND METHOD FOR BOUNCING TRAFFIC IN DEADLOCK SAFE MANNER

BACKGROUND

In any network, a link may fail. When this happens, and particularly when multiple links in the network fail, a switch receiving a packet destined for a particular node of the network may be unable to deliver that packet to its next hop. In such cases, the packets may be dropped until the network is reconfigured to send the packets along another route or until the failed link is repaired. This may take a substantial period of time, and thus result in an unacceptable number of lost packets.

SUMMARY

A system and method for rerouting packets in the event of link failure may reduce packet loss. For example, packets undeliverable from an inner switch to an outer switch because of a failed link may be bounced off another outer switch and further sent to another inner switch for delivery.

One aspect of the disclosure provides a network, comprising a plurality of inner switches, a plurality of outer switches coupled to the plurality of inner switches, wherein each outer switch is associated with a particular inner switch, and wherein at least one inner switch is not associated with any outer switches, and a plurality of host devices coupled to the plurality of outer switches. Each inner switch may be configured to receive traffic, determine whether a link to a next hop for the traffic is down, and forward the traffic to another outer switch if the link to the next hop is down. Each outer switch may be configured to receive traffic from a first inner switch destined for a given one of the plurality of host devices, and send the traffic to a second inner switch if the given host device is not coupled to that outer switch. According to some examples, each outer switch may be programmed to route traffic from one of the plurality of host devices coupled thereto to any of the plurality of inner switches, and from any of the plurality of inner switches to one of the plurality of host devices coupled thereto. Further, each outer switch may be programmed to route traffic from its associated inner switch to any other inner switch. According to one aspect, each of the plurality of inner switches is numbered based on its position in the network. A given outer switch may be programmed to route traffic from one of the plurality of inner switches of lesser number than the given switch's associated switch to one of the plurality of host devices coupled to the given outer switch. Moreover, a given outer switch may be programmed to route traffic from one of the plurality of inner switches of greater number than the given switch's associated switch to one of the associated switch and any of the plurality of inner switches of lesser number than the associated switch. The network may further include a dedicated virtual channel from the given outer switch to the one of the associated switch and any of the plurality of inner switches of lesser number than the associated switch.

Another aspect of the disclosure provides a method for routing traffic through a network including a plurality of inner switches and a plurality of outer switches coupled to the plurality of inner switches, wherein each outer switch is associated with a particular inner switch, and wherein at least one inner switch is not associated with any outer switches. According to this method, the traffic may be received at a given inner switch, wherein a next hop for the traffic is a given outer switch. It may be determined whether a link from the given inner switch to the given outer switch is down, and if the link to the given outer switch is down, the traffic may be forwarded to another outer switch, sent from the another outer switch to another inner switch, and further sent from the another inner switch to the given outer switch.

Yet another aspect of the disclosure provides a network switch, comprising a processor and a memory in communication with the processor. The memory may store instructions executable by the processor to receive the traffic, wherein a next hop for the traffic is a given outer switch, determine whether a link to the given outer switch is down, and forward the traffic to another outer switch if the link to the given outer switch is down. The switch may further include a plurality of downlink ports, wherein at least one first downlink port is dedicated to a link to an associated outer switch, at least one second downlink port is dedicated to a link to an outer switch of greater number than the associated outer switch, and wherein the switch is programmed to receive traffic at one of the first or second downlink ports over a dedicated virtual lane.

A further aspect of the disclosure provides another network switch, comprising a processor and a memory in communication with the processor. The memory may store instructions executable by the processor to receive traffic from a first inner switch destined for a given one of the plurality of host devices, and send the traffic to a second inner switch if the given host device is not coupled to the network switch. This switch may further include a plurality of uplinks, including a first uplink dedicated to at least one associated inner switch, and at least one of a second uplink and a third uplink, wherein the second uplink is dedicated to a greater number inner switch than the associated inner switch and the third uplink is dedicated to a lesser number inner switch than the associated inner switch. It may further include at least one downlink, wherein the at least one downlink is dedicated to a link to a host device.

DETAILED DESCRIPTION

Figure 1:
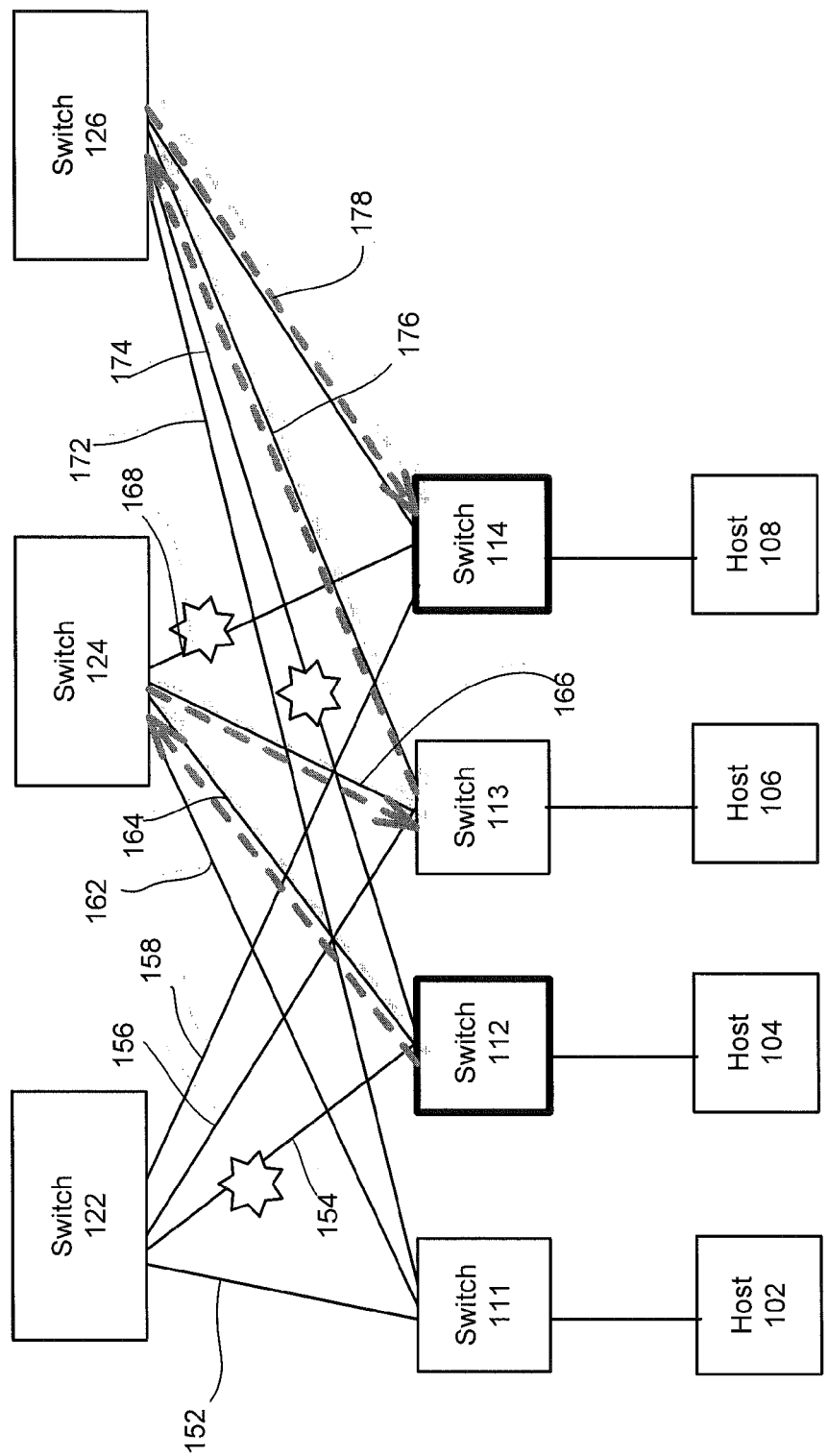
FIG. 1 is a schematic diagram of a network illustrating an example of bouncing traffic according to aspects of the disclosure.

FIG. 1 illustrates a network 100, including a plurality of outer switches 111-114 and a plurality of inner switches 122, 124, 126. The switches 111-114, 122-126 may be routers, switching chips, or any other device or arrangement of devices capable of routing information from one port to another. The outer switches 111-114 may be linked to the inner switches 122-126. For example, each outer switch 111-114 may be linked to each inner switch 122-126 via links 152-158, 162-168, 172-178. Individual inner switches 122-126 may be associated with one or more outer switches 111-114. For example, the inner switch 122 may be associated with the outer switches 111, 112, while the inner switch 124 is associated with the outer switches 113, 114. The inner switch 126 may not have any associated outer switches, although it is linked to each outer switch 111-114. Each of the outer switches 111-114 may be coupled to a computing device, such as servers, personal computers, or host devices 102-108. While only a few inners switches, outer switches, and host devices are shown in this example, any number of switches or hosts may be included.

In some instances, particular links between the inner switches 122-126 and the outer switches 111-114 may fail. For example, the links may become disconnected, damaged, or otherwise incapable of properly transmitting information. In other instances, the links may be congested or overloaded. As shown in FIG. 1, the link 154 between the switch 122 and the switch 112 is down, the link 168 between the switch 124 and the switch 114 is down, and the link 174 between the switch 126 and the switch 112 is down. This may be problematic. For example, because of all the down links 154, 168, 174, at least the outer switches 112, 114 no longer have any inner switch 122-126 to which they both connect. According to this example, any packets sent from the host 104 to the host 108 may be dropped because no inner switch connected to the switch 112 is also connected to the switch 114, and are discussed in further detail below in connection with FIG. 3.

To prevent such packet loss, the packets destined for the host 108 may be bounced off another outer switch and up to an inner switch having an active link to the destination. For example, traffic from the switch 112 destined for the host 108 may be sent up to the switch 124, and may bounce off the outer switch 113 to the inner switch 126 for delivery to the outer switch 114.

In bouncing traffic off outer switches, a given set of rules may need to be followed, for example, to avoid deadlock. These rules may be implemented in each of the outer switches 111-114.

Figure 2:
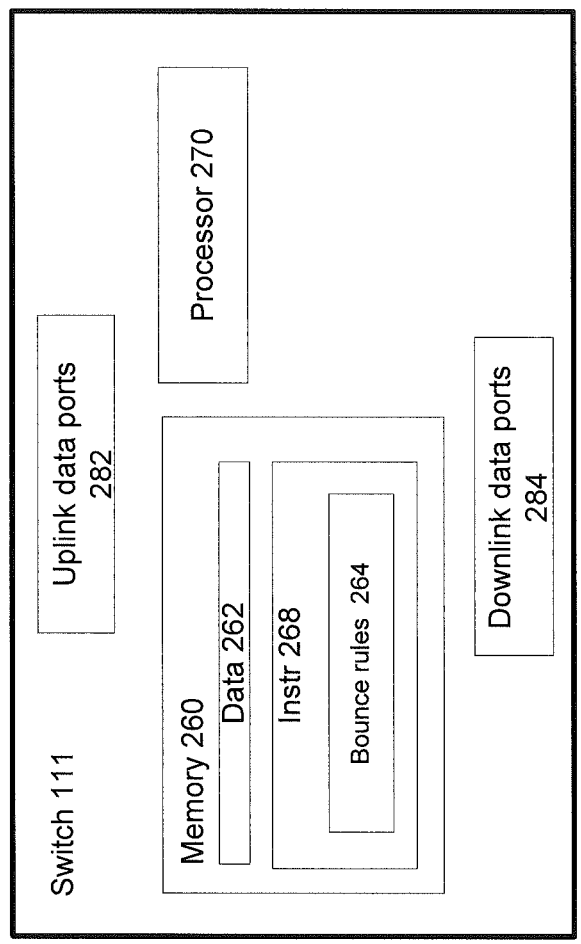
FIG. 2 is a block diagram of a switch according to aspects of the disclosure.

FIG. 2 illustrates an example of one of the outer switches 111. The outer switch 111 may include a memory 260, processor 270, and a number of data ports, such as uplink ports 282 and downlink ports 284.

The memory 260 stores information accessible by processor 270, including instructions 268, and data 262 that may be executed or otherwise used by the processor 270. The memory 260 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 268 may be any set of instructions to be executed directly (such as machine code) or indirectly (such as scripts) by the processor 270. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below. According to some aspects, the instructions 268 may include bounce rules 264, such as the set of rules mentioned above for preventing deadlock.

The data 262 may be retrieved, stored or modified by processor 270 in accordance with the instructions 268. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 270 may be any conventional processor, such as processors in commercially available switches. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The uplink data ports 282 may provide connections to the inner switches. The uplink ports 282 may, for example, be coupled to a link or cable which is further coupled to the inner switches. According to some aspects, particular uplink ports 282 may be dedicated to particular inner switches. For example, some uplink ports in the switch 111 may be dedicated to the associated inner switch 122, while other ports are dedicated to higher numbered switches 124, 126. The downlink data ports 284 may provide connections to one or more computing devices, such as host devices.

While the components of the switch 111 have been described with respect to a particular outer switch, it should be understood that a similar architecture may be imparted to any of the other switches in the network 100.

Figure 3:
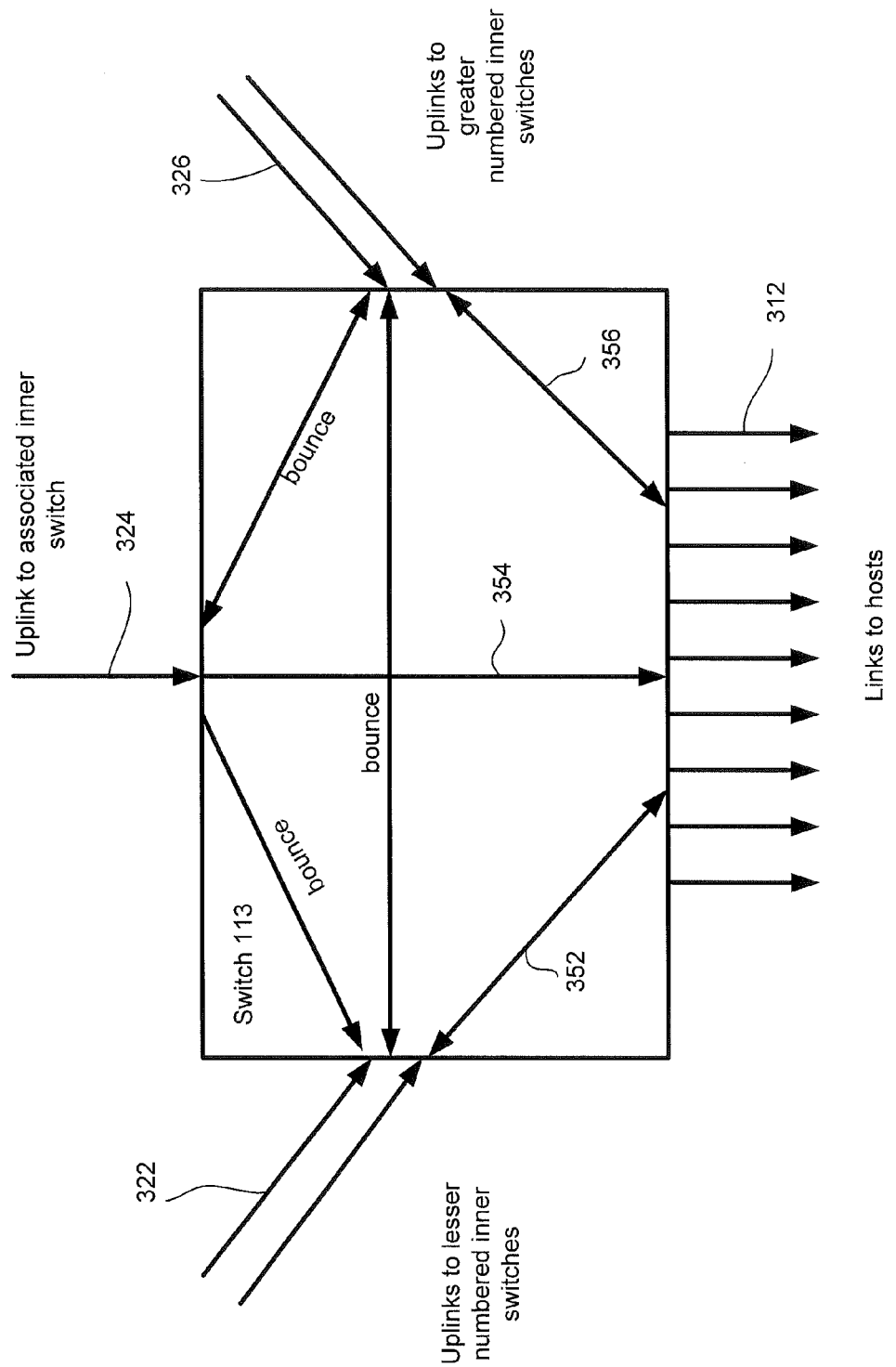
FIG. 3 is an example of switching techniques according to aspects of the disclosure.

FIG. 3 illustrates an example of switching techniques or rules which may be implemented by one of the outer switches 111-114. For purposes of this example, these rules are described with respect to the outer switch 113, which is associated with the inner switch 124 and includes uplinks 324 thereto. The switch 113 also includes uplinks 326 to greater numbered inner switch 126 and uplinks 322 to lesser numbered inner switch 122. Further, the switch 113 includes downlinks 312 to host devices.

As a first rule, any host port linked with the switch 113 can route to any of the uplinks 322, 324, 326. Similarly, any of these uplinks may route to any of the host ports 312. This relationship is signified by the arrows 352, 354, 356.

As a next rule, the uplink 324 from the associated inner switch 124 to the switch 113 can route trampoline traffic to any of the lesser numbered switches 122 or greater numbered switches 126. For example, if traffic at the inner switch 124 cannot be routed to a given outer switch, for example because of a failed link, the switch 113 may be used to bounce the traffic up to another inner switch. The switches to which the traffic may be bounced include the switches 122, 126.

As a next rule, the uplinks 326 to the switch 113 from any greater numbered switch can route trampoline traffic up to the associated switch 124 or to any lesser numbered switch 122. The traffic to the lesser numbered switches 122 may be routed using a dedicated virtual channel. For example, the virtual channel may support multiple "logical" links on one physical link. Each virtual channel may have separate buffering, and therefore one virtual channel where packets cannot flow for some reason (such as congestion) cannot block another virtual channel, even though they use the same physical link. In this regard, using the virtual channel may prevent creation of a dependency cycle or deadlocking, because without the virtual channel, two flows could end up blocking each other.

As a last rule, the uplinks 322 to the switch 113 from any lesser numbered switches 122 can only route to hosts. Therefore, traffic from a lesser numbered inner switch 122 cannot be bounced off the switch 113.

In summary, packets that arrive at an outer switch from an associated inner switch can bounce to any other inner switch. Packets from greater numbered inner switches can be reflected to other inner switches of no greater value. If multiple options for routing traffic within these rules exist, the next hop may be determined, for example, based on congestion or randomly. Packets from lesser numbered inner switches must route to a host.

Within an inner switch, trampoline traffic may also be subject to some restrictions. For example, trampoline traffic arising from an associated outer switch or greater numbered outer switch must use a dedicated virtual lane. It can take no hops interior to the inner switch, and must instead immediately descend to an outer switch that is not associated with the inner switch. Accordingly, some destinations may not be reachable through an inner switch with which an outer switch is associated.

These restrictions may have particular routing implications from the perspective of a given inner switch, such as the inner switch 124 of FIG. 1. For example, traffic sent down to every outer switch associated with inner switches of greater number than the switch 124 must arrive at its destination.

Another implication is that traffic arriving up from one of the outer switches 113, 114 associated with the switch 124 is sent to some destination outer switch associated with another inner switch (other than the inner switch 124). Alternatively, this traffic bounces off some trampoline outer switch back up to another inner switch. In either case, this traffic is carried on distinct virtual channels. Accordingly, in some examples, this may imply that at most one interior hop can be taken.

Yet another implication is that traffic arriving up from some outer switch 111, 112 which is not associated with the switch 124 may take one of three actions. First, it may be routed from the switch 124 to its destination outer switch. Second, it may bounce off some trampoline outer switch back up to its associated inner switch 122. Third, it may bounce off a trampoline associated with the switch 124 back up to any inner switch 126 of greater number than the switch 124.

While the example of FIG. 1 only includes one bounce (e.g., off the switch 113), any number of bounces may occur in order for traffic to reach its destination. For example, in some instances, additional link failures may require additional bounces to be performed.

Figure 4:
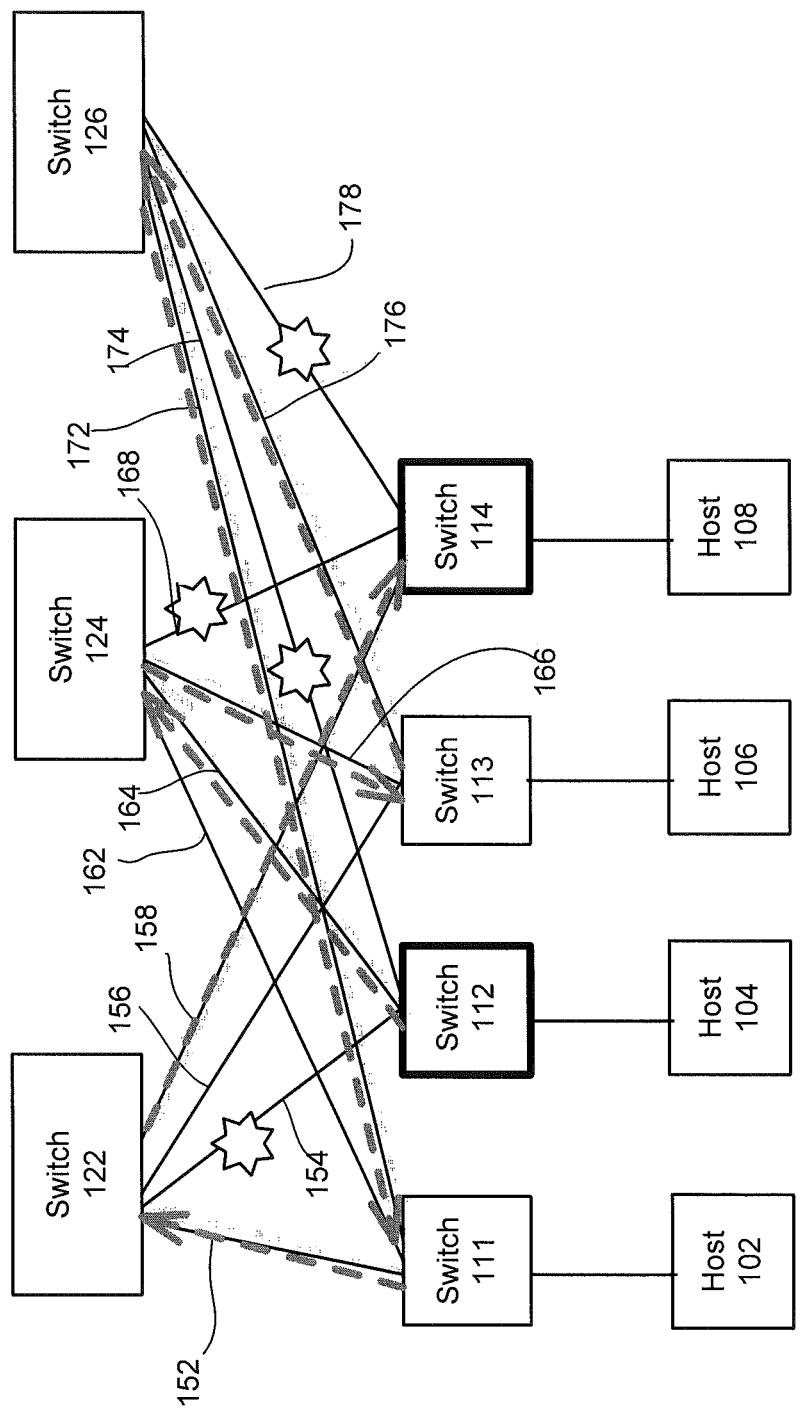
FIG. 4 is a schematic diagram of a network illustrating another example of bouncing traffic according to aspects of the disclosure.

FIG. 4 illustrates an example of such additional bounces. As shown, in addition to the links 154, 168, and 174 being down, the link 178 is also down. Accordingly, the switch 126 cannot deliver packets to the switch 114 as in FIG. 1. Therefore, the switch 126 may route the traffic to the switch 111. The switch 111 may then bounce the traffic up to the switch 122 for delivery to the switch 114. While the number of bounces has increased, each of these bounces still follows the rules described in connection with FIG. 3.

Figure 5:
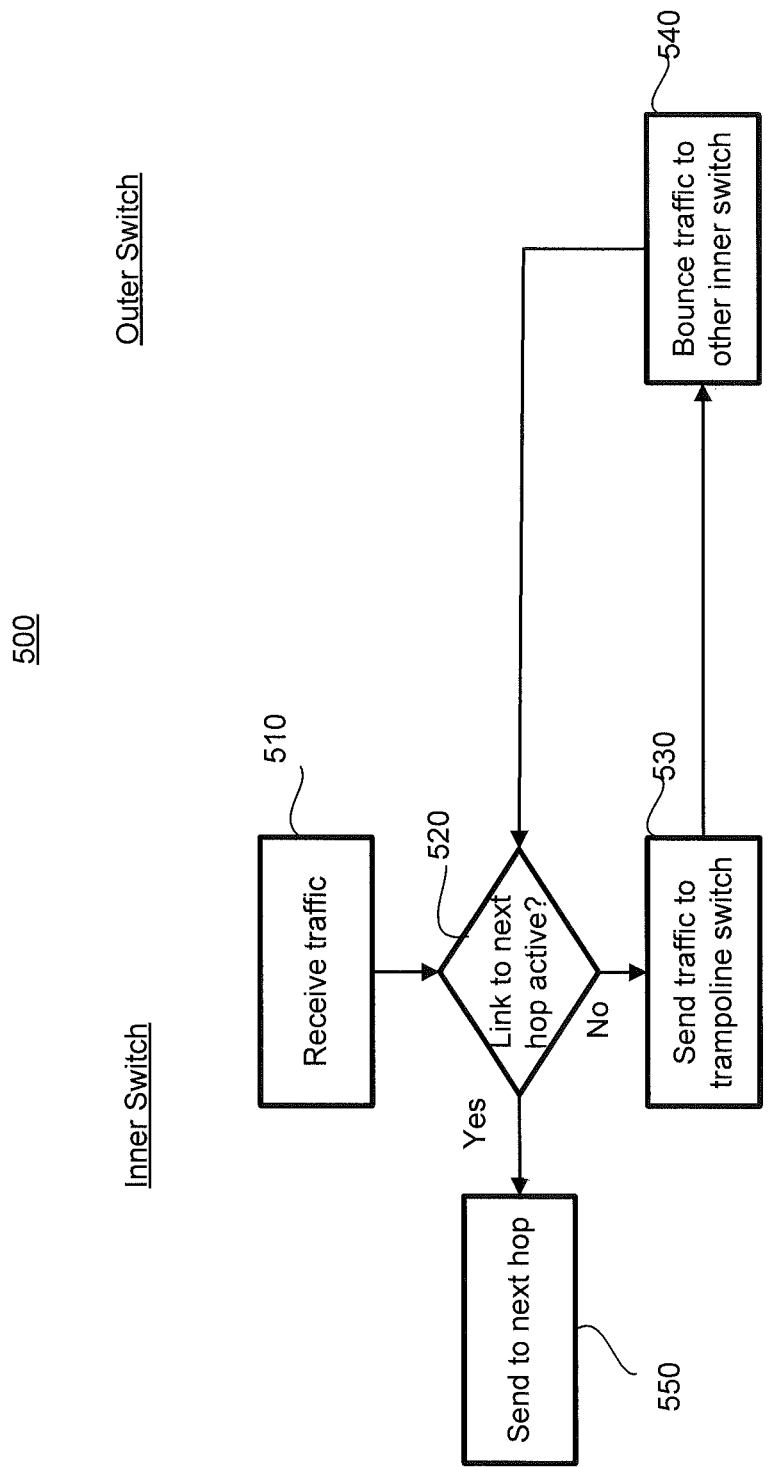
FIG. 5 is a flow diagram of an example method according to aspects of the disclosure.

FIG. 5 is a flow diagram illustrating a method 500 according to aspects of the disclosure. According to this method 500, traffic that is undeliverable to its destination because of a failed link may be bounced off one or more trampoline switches until it can be delivered to its destination. While the description below refers to a number of blocks of the method 500 in a particular order, it should be understood that the order in which the blocks are performed may be modified, and blocks may be added or omitted.

In block 510, traffic may be received at an inner switch. The traffic may be received from, for example, one of the outer switches or a higher tier switch coupled to the inner switch. The traffic may include information, such as header information, identifying its destination. Based on that destination, the inner switch may determine a next hop for the traffic.

In block 520, it is determined whether a link to the next hop is active. For example, at any given time, one or more links in a network may fail for any number of reasons. If all links between the inner switch and the next hop are failed, and therefore there is no active link to the next hop, the traffic may be sent to a trampoline outer switch (block 530). On the other hand, if the link to the next hope is active, the inner switch may simply deliver the traffic over the link to the next hop (block 550).

In block 540, the outer trampoline switch that receives the traffic may bounce the traffic back up to a second inner switch. For example, the trampoline switch may send the traffic to any inner switch that meets a particular set of requirements. The second inner switch may then determine if a link to its next hop is active (block 520), and thus whether it can deliver the traffic to its destination. This cycle of sending traffic to a trampoline switch and bouncing it back up to another inner switch may continue until the traffic is able to be delivered (block 550) or until there are no valid outputs that match the given rules, in which case the packet will be dropped.

While the example systems and methods described above are described in the context of a network having inner switches and outer switches, the concepts described may be adapted to any network. For example, the foregoing techniques may easily be adapted for a multi-stage network having two, four, ten, or more tiers. For example, the inner switches and outer switches may be any two stages of a three-stage or greater network. Moreover, the switches described may be any component or device or combination of components/devices capable of receiving information at a first port and sending the information through a second port. Further, while the foregoing examples are described with respect to one or links being down, it should be understood that the concepts discussed may also be applied in the event of network congestion. For example, if one or more links are overloaded, traffic that would otherwise be sent over such links may be bounced off a trampoline switch and routed over a less congested link.

The above-described aspects of the technology may be advantageous in preventing packet loss that would otherwise occur as a result of one or more failed or congested links. Although traffic may ultimately take a longer route to reach its destination, and therefore an overall time to reach the destination may be longer, this is still preferable to dropping the packets altogether. Moreover, by implementing particular rules for bouncing traffic back up to the inner switches, deadlock may be prevented.

Although the present disclosure makes reference to particular examples, it should be understood that these examples are merely illustrative of the principles and applications of the subject matter of the claims. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative examples. However, these and that other arrangements may be devised without departing from the spirit and scope of the subject matter defined by the appended claims.

The invention claimed is:

1. A network, comprising:
   a plurality of inner switches;
   a plurality of outer switches coupled to the plurality of inner switches, wherein each outer switch is associated with a particular inner switch, and wherein at least one inner switch is not associated with any outer switches; and
   a plurality of host devices coupled to the plurality of outer switches;
   wherein each inner switch is configured to receive traffic from one of the plurality of outer switches, determine whether a link to a next hop outer switch for the traffic is down, and forward the traffic directly to another outer switch if the link to the next hop outer switch is down;
   wherein each outer switch is configured to receive traffic from a first inner switch destined for a given one of the plurality of host devices, and send the traffic directly to a second inner switch if the given host device is not coupled to the outer switch that received the traffic from the first inner switch; and
   wherein each of the plurality of inner switches is numbered based on its position in the network; and wherein a given outer switch is programmed to route traffic from one of the plurality of inner switches of greater number than the given switch's associated switch to one of the associated switch and any of the plurality of inner switches of lesser number than the associated switch;
   the network further comprising a dedicated virtual channel from the given outer switch to the one of the associated switch and any of the plurality of inner switches of lesser number than the associated switch.

2. The network of claim 1, wherein each outer switch is programmed to route traffic from one of the plurality of host devices coupled thereto to any of the plurality of inner switches.

3. The network of claim 1, wherein each outer switch is programmed to route from any of the plurality of inner switches to one of the plurality of host devices coupled thereto.

4. The network of claim 1, wherein each outer switch is programmed to route traffic from its associated inner switch to any other inner switch.

5. The network of claim 1, wherein each of the plurality of inner switches is numbered based on its position in the network; and wherein a given outer switch is programmed to route traffic from one of the plurality of inner switches of lesser number than the given switch's associated switch to one of the plurality of host devices coupled to the given outer switch.

6. A method for routing traffic through a network including a plurality of inner switches and a plurality of outer switches coupled to the plurality of inner switches, wherein each outer switch is associated with a particular inner switch, and wherein at least one inner switch is not associated with any outer switches, the method comprising:
   receiving the traffic at a given inner switch from one of the plurality of outer switches, wherein a next hop for the traffic is a given outer switch;
   determining whether a link from the given inner switch to the given outer switch is down;
   if the link to the given outer switch is down:
   forwarding the traffic directly from the given inner switch to another outer switch;
   sending the traffic directly from the another outer switch to another inner switch; and
   sending the traffic from the another inner switch to the given outer switch;
   wherein each of the plurality of inner switches is numbered based on its position in the network, and wherein if the given inner switch is of greater number than the another outer switch's associated inner switch, the method further comprises sending the traffic to one of the associated inner switch and any of the plurality of inner switches of lesser number than the associated switch using a dedicated virtual channel.

7. The method of claim 6, wherein each of the plurality of inner switches is numbered based on its position in the network; and wherein if the given inner switch is of lesser number than the another outer switch's associated inner switch, the method further comprising sending the traffic to a host device coupled to the another outer switch.

* * * * *